B. VOLKMAR.
PROTECTIVE CASING.
APPLICATION FILED DEC. 9, 1909.
962,680.
Patented June 28, 1910.
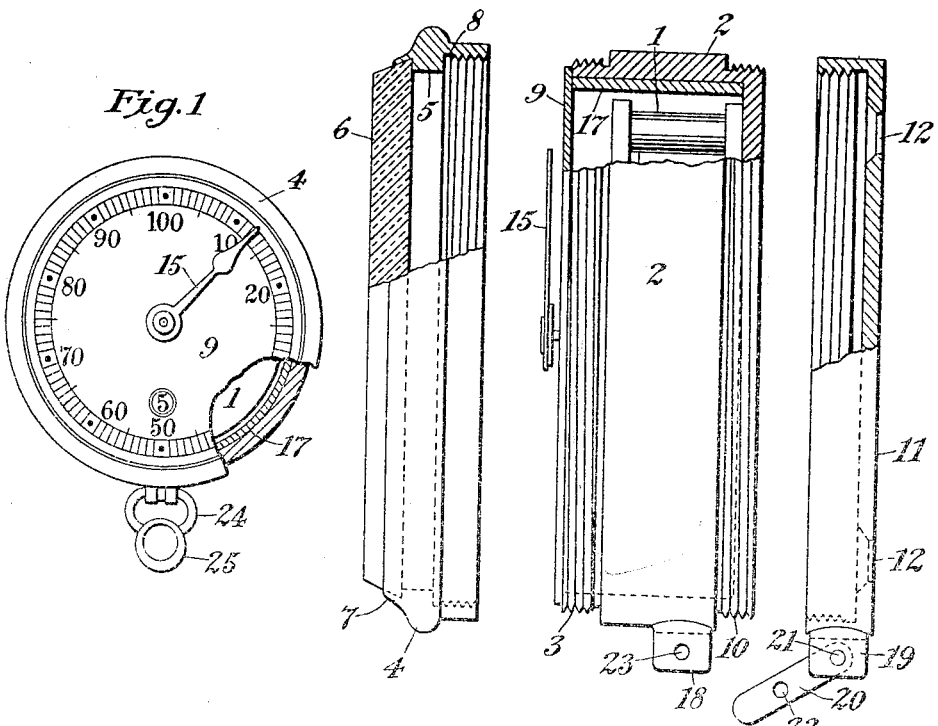
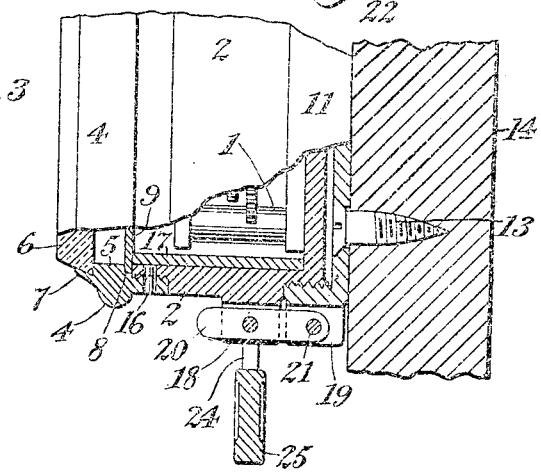
Witnesses:
Wm. Ashley Kelly
Victor D. Borst
Inventor
Bernhard Volkmar
By his Attorney
Henry D. Williams

UNITED STATES PATENT OFFICE.

BERNHARD VOLKMAR, OF NEW YORK, N. Y., ASSIGNOR TO AUTO IMPROVEMENT COMPANY, A CORPORATION OF NEW YORK.

PROTECTIVE CASING.

962,680.  Specification of Letters Patent.  Patented June 28, 1910.

Original application filed September 4, 1908, Serial No. 451,706. Divided and this application filed December 9, 1909. Serial No. 532,176.

*To all whom it may concern:*

Be it known that I, BERNHARD VOLKMAR, a citizen of the United States, residing at the borough of the Bronx, city of New York, in the county of New York and State of New York, have invented certain new and useful Improvements in Protective Casings, of which the following is a specification, reference being had therein to the accompanying drawings, forming part thereof, this application being divisional of my application for Letters Patent for vibration-indicator, Serial No. 451,706, filed September 4, 1908.

My invention relates to protective casings and is adapted to inclose a mechanism which it is desired to protect from tampering.

The principal objects of my invention are simplicity and economy of construction, and effectiveness in operation.

In my invention, the mechanism to be protected is inclosed in a casing and means are provided to prevent access to the casing for the purpose of tampering with or readjusting the mechanism. Also the casing inclosing the mechanism is provided with a hard lining to prevent the insertion therein of a tool or a like instrument with the intent to temporarily derange the mechanism. Also means are provided for securing the casing to a support, such means being releasable only from within the casing, which is sealed to prevent access to the securing means so that the device cannot be removed from its support without detection.

So far as the present invention is concerned, the nature of the mechanism to be protected is immaterial, but I have employed the invention to protect the mechanism of a vibration indicator, such as described in the above mentioned parent application. Such an indicator is adapted to be placed on a vehicle to furnish a register of the movements of the vehicle, particularly an indication of the unauthorized use of the vehicle, and it is in connection with this use that the invention is shown in the accompanying drawings, in reference to which I shall now describe my invention and thereafter point out my invention in claims.

Figure 1 is a front view, with portions broken away, to show the hard protective lining. Fig. 2 is a side elevation, partly in section and partly broken away, to show the inclosed mechanism and with the front cover and the rear cover detached. Fig. 3 is a side elevation, partly broken away to show the inclosed mechanism, and partly in section to show the means for sealing the casing.

In the illustrated embodiment of the invention, the mechanism 1 to be protected is shown as inclosed in a cup-casing 2, provided at its front end with an externally threaded portion 3, upon which is screwed a front cover 4. This cover comprises a circular metal ring having a shouldered portion 5 upon which a circular glass plate 6 is arranged to lie. The front end of the cover is shown as turned down to a thin edge 7 and burnished or pressed down over the glass plate to hold it securely in place. The shouldered portion 5 has a small recess 8 to receive a dial 9. The casing 2 is provided at its rear end with an externally shouldered portion 10, upon which a rear cover or backing plate 11 is secured. Holes 12 are countersunk in the backing plate for screws 13, which secure the device to a support 14, which may be the dashboard or other convenient part of a vehicle.

The mechanism 1 is shown as provided with an indicating hand 15 movable over the dial 9. Sealing means are provided to prevent secret access to the dial 9 or to the mechanism 1 of the device. To prevent the removal of the front cover 4 after it has once been screwed upon the casing, a small hole is drilled through the cover and the casing at that portion where the one is screwed upon the other, and into this hole, as shown in Fig. 3, is tightly fitted a small pin 16 of the same material as the cover. The end of this pin is filed off smooth with the outer surface of the cover and the whole is polished to hide all traces of the pin and its location. Furthermore, a steel lining 17, hereinafter more particularly described, will prevent the pushing in of this pin.

The rear cover or backing plate 11 is shown as sealed to the casing 2 in a different manner. Two slotted lugs 18 and 19 are carried by adjacent portions of the casing and backing plate, respectively. A bar 20 is secured to the lug 20 and arranged to swing upon a pin 21 bridging the slot of the lug 19. When the backing plate 11 is screwed upon the casing 2 so that the slots of the two lugs will be in alinement, the pivoted bar 20 is swung over and into the slot of the lug 18. A hole 22 in the bar 20 corresponds to holes 23 in the walls of the lug 18 so that a wire 24 may be passed through the walls of the lug and through the bar 20 to lock the bar in the slot. The ends of the wire are then sealed with a lead seal 25, which may have a distinctive design thereon.

In mounting the device upon the dashboard, the backing plate 11 is first screwed upon the dashboard. The casing 2 is then screwed into the backing plate and sealed thereto. As shown in Fig. 3, the heads of the screws 13, which secure the device to the dashboard of the vehicle, are within the casing so that the screws cannot be unscrewed to remove the device from the dashboard without first removing the casing from the backing plate.

To prevent the insertion of a tool into the mechanism 1 of the device with the object of temporarily deranging the same, the steel lining 18, hereinbefore referred to, is fitted to lie against the inner wall of the cup-casing 2, the lining being capable of resisting a steel drill of the ordinary hardness. This lining also prevents forcing in the pin 17 which locks the front cover to the body of the casing.

To prevent the influencing of the mechanism 1 by a strong magnetic force, such mechanism may be made of a material not controllable by any magnetic force which could practicably be employed for this purpose, preferably brass.

It is obvious that various modifications may be made in the construction shown and above particularly described within the principle and scope of my invention.

I claim:

1. A protective inclosing casing comprising two parts secured together by rotational engagement, means for securing the casing to a support, such means being releasable only from within one of said parts and being protected from access by the other part, and means for sealing the two parts together comprising lugs on both parts, a bar adapted to engage with such lugs to prevent disengaging rotation of the parts, and a seal for holding the bar in such engaging position.

2. A protective inclosing casing comprising two parts secured together by helical engagement, means for securing the casing to a support, such means engaging one of said parts and having a head located within the parts, and means for sealing the two parts together comprising lugs on both parts, a bar adapted to engage with such lugs to prevent disengaging rotation of the parts, and a seal for holding the bar in such engaged position.

3. A protective inclosing casing comprising two parts secured together by helical engagement, means for securing the casing to a support, such means engaging one of said parts and having a head located within the parts, and means for sealing the two parts together comprising lugs on both parts, a bar adapted to engage with such lugs to prevent disengaging rotation of the parts, and a sealing wire for holding the bar in such engaged position.

4. A protective inclosing casing comprising a front cover, a body and a back cover all secured together, means for locking together the body and back cover, a pin for locking together the front cover and body, and a steel lining within the casing abutting against the inner end of the locking pin.

In testimony whereof I have affixed my signature in presence of two witnesses.

BERNHARD VOLKMAR.

Witnesses:
WM. ASHLEY KELLY,
VICTOR D. BORST.